United States Patent Office 3,247,165
Patented Apr. 19, 1966

3,247,165
POLYIMIDES
Jacob S. Rodia, St. Paul, Minn., assignor to Minnesota Mining and Manufacturing Company, St. Paul, Minn., a corporation of Delaware
No Drawing. Filed Nov. 15, 1962, Ser. No. 238,046
10 Claims. (Cl. 260—65)

This invention relates to thermally resistant polymers and more particularly to certain novel mixed aromatic-heterocyclic polyimides.

A number of linear polymeric polyimides are known and some of these have useful properties which permit them to be shaped into films or sheets. An especially useful property of such films is their ability to withstand high temperatures without decomposition or embrittlement. While some of the polyimides heretofore known have had useful high temperature properties, they have also in some cases suffered from lack of hydrolytic stability and therefore were not useful in moist or wet environments. Thus, the production of high temperature-resistant polymers having useful hydrolytic stability, particularly those having good dielectric properties, is especially desirable.

It is an object of the present invention to produce certain new polyimides having useful high temperature properties.

It is a further object of the invention to produce polyimides which are hydrolytically stable and have good dielectric properties in addition to their resistance to high temperatures. Other objects of the invention will be apparent from the disclosures hereinafter made.

In accordance with the above and other objects of the invention, it has been found that polyimides formed by the reaction of benzophenone tetracarboxylic acid dianhydride and certain heterocyclic diamines can be produced in a two-stage process ultimately resulting in polymers having repeating units of the formula:

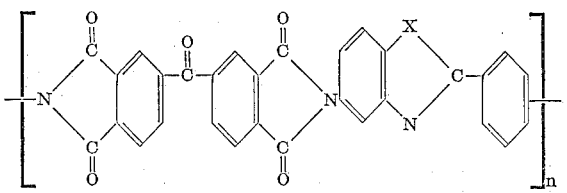

wherein $n$ is a number from 40 to 1000 or more, are extremely useful substances.

The polymers of the invention can be formed into thin films, which are tough and flexible and have high tensile strength and modulus of elasticity. They are stable at temperatures up to about 800° C., depending upon the atmosphere in which they are heated, with very low weight loss. At the same time, they are very resistant to hydrolysis, withstanding even concentrated hydrochloric acid at 60–70° C., and are insoluble in all common organic solvents.

For producing the compounds of the invention, a 3,3′,4,4′-benzophenone tetracarboxylic acid derivative such as, for example, the dianhydride is reacted with a diamine of the formula:

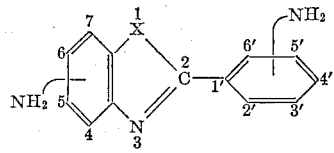

wherein X is a member of the group consisting of —O—, —S—, and —NH— groups. In the formula, the amino group substituents can be in any of the non-hindered positions. Compounds of this type are prepared by the processes described in Berichte der Deutschen Chemischen Gesellschaft, vol. 32, pp. 1431 ff., 2178 ff. and 3537 ff., 1899.

The polymers of the invention are formed in two reaction stages. In the first stage, a polyamic acid is formed according to the equation:

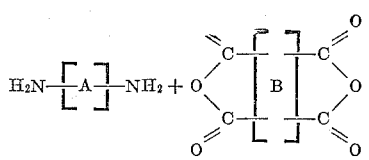

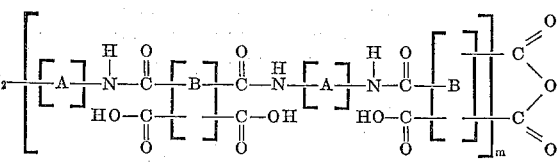

wherein

represents the divalent residue of the heterocyclic diamine and

represents the tetravalent residue of benzophenone, and $m$ is a number upwards of about 20.

In this stage, the polymers are soluble in certain solvents as hereinafter described and are most easily handled for fabrication. Plasticizers, pigments, fillers and the like can be added to these first stage polymers.

Upon removal of the solvent and elimination of water as by heating under atmospheric pressure or in vacuo, or by chemical treatment as with dehydrating agents (e.g., acid anhydrides) a second stage polymer is formed having the structure shown in the formula:

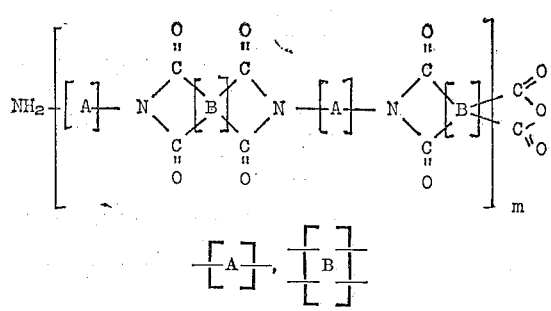

wherein
and $m$ have the significance heretofore set forth.

Some inter- and intra-molecular bonding occurs during elimination of the water and the polymers are stabilized to solid, infusible resins. These are flexible and tough, with high dielectric strength and low loss factor even after heating at 350° C. Any fillers, pigments, plasticizers and the like which are not eliminated by the process for converting first stage polymer to the second stage will remain and form part of the final structure.

The polymers of the invention are readily prepared by condensation of the tetracarboxylic acid dianhydride with the diamine, preferably in solution in a suitable solvent. In this way, first-stage polymer solutions are formed which can be used to cast films, make coatings and the like. Examples of solvents which are useful for the purpose are dimethylacetamide, dimethylformamide, dimethylsulfoxide, N-methylpyrrolidone and the like. If desired, after admixture of the reactants, the reaction mixture can be warmed slightly to a temperature of the order of about 25 to 50° C.

Preferably, the diamine is placed in solution and the tetracarboxylic acid derivative is added thereto in substantially stoichiometric amount. The first stage polymers which are formed are somewhat yellowish and for best results are prepared to have inherent viscosity in dimethylacetamide, dimethylformamide, etc. of the order of about 0.25 to 1.5.

It is of course to be understood that $n$ and $m$ in the formula set forth above are average values representing a number of chains having various numbers of repeating units, as in the case of other substantially linear polymers.

The removal of the elements of water from the first-stage polymer to "cure" or stabilize the polymers in the second stage is readily effected by heating to a temperature in the range of 90 to 300° C. At the same time, any solvent present is evaporated, leaving the polymer as a hard, essentially infusible mass. The polymers thus formed have no melting point, but when heated to decomposition in air, at temperatures over 400° C., they darken and char.

The polymers of the invention can be formed into transparent films by solvent casting in the first stage form followed by removal of solvent and removal of water to form the second stage. These films are extremely strong and retain their strength and flexibility at temperatures up to about 700° F. in air. They are characterized by their excellent solvent resistance including hydrolytic resistance, their non-flammability and outstanding resistance to gamma-ray radiation. They have excellent dielectric properties and can be employed as electrical insulators, such as wire enamels and insulating coatings, particularly for application where high temperatures are encountered. In the toughness test set forth in U.S. Patent 2,710,853, these films exhibit a degree of toughness greater than 3. Laminates can be made from the polymers as by impregnating glass fiber cloth with a solution of first stage polymer, pressing several layers together and heating under pressure. The laminates can be formed into any desired shape prior to removal of solvent and conversion to the second stage.

Films of the polymers of the invention can be used as sheet insulation in electric motors and transformers, cables, capacitors and the like.

The following examples will more specifically illustrate the polymers of the invention and the process for their preparation. In the examples, all parts are by weight unless otherwise specified.

*Example 1*

A solution of 8.7 parts (0.039 moles) of 2-(p-aminophenyl)-5-amino-benzoxazole in 70 ml. of distilled dimethylacetamide was warmed to about 35° C. To the solution was added with stirring about 12.5 parts (0.039 mole) of 3,3',4,4'-benzophenone tetracarboxylic dianhydride. The dianhydride was added in one or two gram portions at 5 to 10 minute intervals with stirring. After about 12 grams of the dianhydride had been added to the reaction mixture, the increments were changed to 0.05 to 0.01 part increments, noting changes in viscosity after each addition. This procedure was employed in order to avoid an excess of the dianhydride which might cause degradation. When pure amines and pure acid derivatives are used, simple mixing of stoichiometric amounts is all that is required. As the addition proceeds, the mixture becomes very viscous. The condensation reaction was completed in an hour, resulting in a viscous, light yellow solution of first stage polymer in solution in dimethylacetamide, which could be spread to form a film.

Films were formed by casting the solution of polymer obtained as set forth above on glass or aluminum plates followed by heating in an air oven to eliminate the solvent and eliminate water from the polymer to form the second stage, stabilized or "cured" insoluble polymer (as, for example) for 2 hour periods at temperatures of about 90, 160 and 260° C. These were glossy, transparent, slightly yellowish films and were prepared from about 0.1 to 3 mils in thickness. They had tensile strength of 15,000 p.s.i., modulus of 200,000 p.s.i. and about 5 to 10 percent elongation. These sheets were extremely tough and could be flexed and creased numerous times without breaking. Their toughness was of the order of 3 or more, and the films retained this degree of toughness even after heating to 370° C. for several hours in air.

When a mixture of 30 parts of N-methylpyrrolidone, 15 parts of dimethyl acetamide and 15 parts of toluene were used as a solvent in the above procedure, the films ultimately produced exhibited about 20 percent elongation.

*Example 2*

A solution of 6.3 parts of previously sublimed 2-(m-aminophenyl)-5-aminobenzoxazole in about 50 ml. of distilled dimethylacetamide was warmed to about 35° C. To this solution were added 9.9 parts of 3,3',4,4'-benzophenone tetracarboxylic dianhydride, adding one to two part portions until a total of about 8 parts had been added, and then reducing the size of the portions to about one tenth part. Warming was continued at 35° C. for about 2 hours. The inherent viscosity of the stage polymer thus formed was about 0.285. A viscous, slightly yellowish solution was formed containing the first stage polymer.

The solution of first stage polymer was cast into a film, spreading it on a sheet of glass, and cured by heating at about 125° C.; and the somewhat yellowish, transparent film had tensile strength of 12,000 p.s.i., modulus of 200,000 p.s.i. and elongation of about 5–10 percent. The film retained strength and toughness even after heating to 370° C. for 2 hours in air.

*Example 3*

A solution of about 4.5 parts of previously sublimed 2-(m-aminophenyl)-5-aminobenzimidazole in about 100 ml. of distilled dimethylacetamide is warmed to about 35° C. To this solution are added 6.4 parts of 3,3',4,4'-benzophenone tetracarboxylic dianhydride, adding one to two part portions until a total of about 5.8 parts have been added, and then adding smaller portions. Warming is continued for about 2 hours, measuring the inherent viscosity of the solution of the polymer as formed until viscosity of about 90 stokes at 30° C. is reached. A viscous solution of first-stage polymer was thus obtained. When formed into a film by spreading the viscous solution on a glass plate and heating to about 150° C. for about 4 hours, a glossy, yellowish, transparent sheet of second stage polymer is produced, of about 2 mils thickness. The sheet exhibits tensile strength and modulus of the order of that of the films of Examples 1 and 2, and elongation of about 5–10 percent. The film retains strength and toughness even after heating to 370° C. for 2 hours in air.

*Example 4*

The procedure of Example 3 was repeated using 4.8 parts of 2-(p-aminophenyl)-5-aminobenzothiazole. A viscous, quite yellow solution of first stage polymer was formed, which, on spreading to a film on glass and heating to about 150° C. for 4 hours, formed a tough, glossy, infusible transparent yellow sheet.

Solutions of the first stage polymers of the invention in inert organic solvents are useful in the production of shaped articles of the second stage polymers. Inert solvents useful for this purpose include any organic solvent which is inert toward the said polymers, i.e., does not exert a chemical dehydration action, and in which the material is appreciably soluble. These include, e.g., the solvents named hereinabove as solvents for the polymerization.

The first stage polyamic acid polymers of the invention are readily isolated from the solution in which they are formed. A convenient way to isolate the intermediate polyamic acid form of the copolymers of the invention is to precipitate them from solution with water. The viscous solution in which the first stage is formed is diluted with say about 5 volumes of additional solvent such as that used in the reaction. The resulting diluted solution is mixed with a large volume of water. The polymer precipitates and is recovered as by filtration, washed with water and dried in vacuo at low temperatures, of the order of about 50° C. The resulting white to gray dry shredded mass can be stored indefinitely under cool, dry conditions. Whenever desired, it can be redissolved and employed for further fabrication procedures, or for cement or adhesive purposes, in the course of which it is converted to second stage polymer by heating or baking as set forth above.

In this way, first stage polymer was readily isolated from the solution formed by the initial reaction in each of the foregoing examples, and in each case was obtained in the form of a grayish fibrous mass which could be redissolved in N-methyl pyrrolidone.

*Example 5*

Fibers can be produced from the first stage polyamic acids of the invention by wet-spinning procedures.

When the solutions of first stage polymer obtained in the preceding examples are diluted with dimethylacetamide to contain about 10–15 percent solids, they can be used to spin filaments of the second stage polymer. The solution is forced through a spinneret having holes of the desired diameter, say about 3–5 mils in diameter, into a bath composed of 10 percent of pyridine in acetic anhydride, at a temperature in the range of about 50–70° C. Filaments thus produced are strong, insoluble in common organic solvents and show the same thermal resistance as the films hereinabove described. Their strength is improved by heat treatment, as by heating at above 150° C. for several hours to insure complete removal of water.

In measuring inherent viscosity as noted in the examples, the standard method for determining viscosities was employed, at 30° C., the solvent used in the reaction being the solvent employed in the determination.

The films of the polymers of the invention can be oriented, with a resulting increase in strength. Thus, for example, when a film of the copolymer of benzophenone tetracarboxylic anhydride with 2-(p-aminophenyl)-5-amino-benzoxazole is heated to above about 300° C. and stretched, it elongates about 300% and becomes somewhat milky or less transparent in appearance, indicating that it has become at least partly crystalline. The tensile strength of the oriented film has markedly increased to about 50,000 lbs./in.², while the useful dielectric strength and heat resistance remain unchanged.

The intermediate polyamic acids are also capable of forming salts with amines, e.g., pyridine, morpholine, triethylamine and the like as well as other basic substances such as alkali metal hydroxides and carbonates. These salts are soluble in water.

What is claimed is:
1. A copolymer of benzophenone tetracarboxylic acid dianhydride with an amine of the formula:

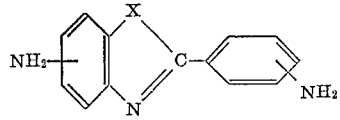

wherein X is a member of the group consisting of —O—, —S— and —NH—, the said copolymer being substantially linear, and being solid, infusible and resistant to hydrolysis.

2. A substantially linear copolymer of benzophenone tetracarboxylic acid dianhydride with an amine of the formula

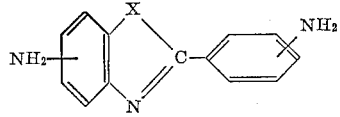

wherein X is a member of the group consisting of —O—, —S— and —NH—, said copolymer being soluble in dimethyl dimethylacetamide and insoluble in water, containing a plurality of amic acid moieties, and being adapted to conversion to a polyimide by elimination of the elements of water from the amic acid moieties.

3. A solution in an organic solvent which is free from dehydrating action, of a copolymer of benzophenone tetracarboxylic acid dianhydride with an amine of the formula:

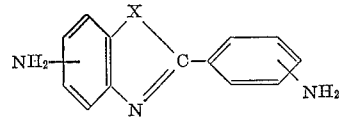

wherein X is a member of the group consisting of —O—, —S— and —NH—, said copolymer being substantially linear, being soluble in dimethyl acetamide and insoluble in water, containing a plurality of amic acid moieties, and being adapted to conversion to a polyimide by elimination of the elements of water from the amic acid moieties.

4. A hydrolysis-resistant, substantially linear, infusible copolymer of benzophenone tetracarboxylic acid dianhydride with an amine of the formula:

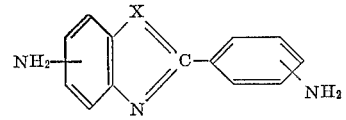

wherein X is a member of the group consisting of —O—, —S— and —NH—, said copolymer containing phthalimide rings, and being stable when heater up to about 700° F. in air.

5. Filaments of a substantially linear, infusible copolymer of benzophenone tetracarboxylic acid dianhydride with an amine of the formula:

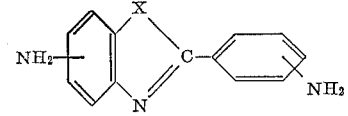

wherein X is a member of the group consisting of —O—, —S— and —NH—, said copolymer containing phthalimide rings, and being hydrolysis-resistant and stable when heated up to about 700° F. in air.

6. Films of a substantially linear, infusible copolymer of benzophenone tetracarboxylic acid dianhydride with an amine of the formula:

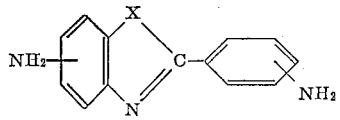

wherein X is a member of the group consisting of —O—, —S— and —NH—, said copolymer containing phthalimide rings, and being hydrolysis-resistant and stable when heated up to about 700° F. in air.

7. A substantially linear, solid, infusible, hydrolysis-resistant copolymer of benzophenone tetracarboxylic acid dianhydride with-(p-aminophenyl)-5-aminobenzoxazole.

8. A substantially linear, solid, infusible, hydrolysis-resistant copolymer of benzophenone tetracarboxylic acid dianhydride with 2-(m-aminophenyl-5-aminobenzoxazole.

9. A substantially linear, solid, infusible, hydrolysis-resistant copolymer of benzophenone tetracarboxylic acid dianhydride with 2-(p-aminophenyl)-5-aminobenzothiazole.

10. A substantially linear, solid, infusible, hydrolysis-resistant copolymer of benzophenone tetracarboxylic acid dianhydride with 2-(m-aminophenyl)-5-aminobenzimidazole.

References Cited by the Examiner
UNITED STATES PATENTS

| | | | |
|---|---|---|---|
| 2,524,046 | 10/1950 | Flory | 260—78 |
| 2,659,712 | 11/1953 | Thompson et al. | 260—65 |
| 2,710,853 | 6/1955 | Edwards et al. | 260—78 |
| 3,037,966 | 6/1962 | Chow et al. | 260—78 |
| 3,075,942 | 1/1963 | Bozer et al. | 260—65 |

OTHER REFERENCES

Ser. No. 389,002, Hopff et al. (A.P.C.), published April 1943.

Chemische Berichte, vol. 32, pp. 1431, 2178, and 3537, 1899.

WILLIAM H. SHORT, *Primary Examiner.*